(12) United States Patent
Takeda (10) Patent No.: US 11,059,529 B2
(45) Date of Patent: Jul. 13, 2021

(54) SPARE TIRE MOUNTING STRUCTURE

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/903,822

(22) Filed: Jun. 17, 2020

(65) Prior Publication Data

US 2020/0391812 A1 Dec. 17, 2020

(30) Foreign Application Priority Data

Jun. 17, 2019 (JP) ............................. JP2019-111751

(51) Int. Cl.
*B62D 43/10* (2006.01)
*B60K 1/04* (2019.01)
*H01M 50/20* (2021.01)

(52) U.S. Cl.
CPC ............. *B62D 43/10* (2013.01); *B60K 1/04* (2013.01); *H01M 50/20* (2021.01); *B60K 2001/045* (2013.01); *B60K 2001/0438* (2013.01)

(58) Field of Classification Search
CPC .. B62D 43/10; B60K 1/04; B60K 2001/0405; B60K 2001/0416; B60K 2001/0438; B60K 2001/045; B60R 16/04; H01M 2/1083

USPC .......................................... 296/37.2; 180/68.5
See application file for complete search history.

(56) References Cited

U.S. PATENT DOCUMENTS

| 6,854,543 | B2* | 2/2005 | Rowley ................... B60R 16/04 180/68.5 |
| 8,567,543 | B2* | 10/2013 | Kubota .................... B60K 6/40 180/68.5 |
| 9,873,456 | B2* | 1/2018 | Hara .................. B62D 25/2072 |
| 10,800,244 | B2* | 10/2020 | Sawatzki ................. B60K 1/04 |
| 2017/0210217 | A1 | 7/2017 | Kim et al. |

FOREIGN PATENT DOCUMENTS

JP 2017-132450 A 8/2017

\* cited by examiner

*Primary Examiner* — Joseph D. Pape
(74) *Attorney, Agent, or Firm* — Rankin, Hill & Clark LLP (57) ABSTRACT

In a spare tire mounting structure, a tire mounting device extending in a ladder shape and including a guard member on the front side of a vehicle body is installed on right and left rear frames extending in a front-rear direction along right and left edges in a vehicle width direction of a recessed portion of a rear floor of the vehicle body. The guard member has a shape protruded upward. The tire mounting device is installed above a battery placed in the recessed portion of the rear floor. A spare tire is mounted sideways on this tire mounting device.

11 Claims, 10 Drawing Sheets

SPARE TIRE MOUNTING STRUCTURE

BACKGROUND OF THE INVENTION

1. Field of the Invention

The present invention relates to a spare tire mounting structure in which a battery and a spare tire are placed one above the other in a recessed portion of a rear floor of a vehicle body.

2. Description of the Related Art

As a conventional spare tire mounting structure, there is a spare tire mounting structure described in Patent Literature 1, for example. In this structure, a battery is placed in a recessed portion of the rear floor of the vehicle body, and the placed battery is fixed with a T-shaped bracket in a plan view. Moreover, on the fixed battery, a spare tire placed sideways is fixed with another T-shaped bracket.

Since the battery and the spare tire are separately fixed with the respective brackets in this manner, the battery is not detached even when the spare tire is detached due to a rear collision of the vehicle body.

PRIOR ART DOCUMENT(S)

Patent Literature(s)

Patent Literature 1: JP 2017-132450 A

SUMMARY OF THE INVENTION

With the structure of Patent Literature 1, however, if the impact force of a rear collision is large, the spare tire detached due to the rear collision moves to the front side of the vehicle body at high speed. In this case, the moved spare tire may damage the vehicle body or objects.

The present invention has been made in view of the above circumstances, and an object thereof is to provide a spare tire mounting structure capable of suppressing forward movement of a spare tire due to a rear collision of a vehicle body in a setup where a battery and the spare tire are placed one above the other in a recessed portion of the rear floor of the vehicle body.

In order to achieve the above object, the present invention provides a spare tire mounting structure in which a battery and a spare tire are placed one above the other in a recessed portion of a rear floor of a vehicle body, the spare tire mounting structure including a tire mounting device which is installed on rear frames extending in a front-rear direction along right and left edges of the rear floor, and which mounts the spare tire above the battery housed in the recessed portion. The tire mounting device includes a guard member which restricts forward movement of the spare tire.

The present invention makes it possible to obtain a spare tire mounting structure capable of suppressing the forward movement of a spare tire due to a rear collision of a vehicle body in a setup where a battery and the spare tire are placed one above the other in a recessed portion of the rear floor of the vehicle body.

DETAILED DESCRIPTION OF THE EMBODIMENTS

Structure of Embodiment

An embodiment of the present invention is described in detail with reference to FIGS. 1 to 10. In the description, the same elements are denoted by the same reference numerals, and redundant description is omitted. In addition, in the figures, "front and rear" indicated by arrows means the front-rear direction of the vehicle body of the automobile (not shown), "right and left" indicated by arrows means the width direction of the vehicle body, and "upper and lower" indicated by arrows means the vertical upper-lower direction.

Figure 1:
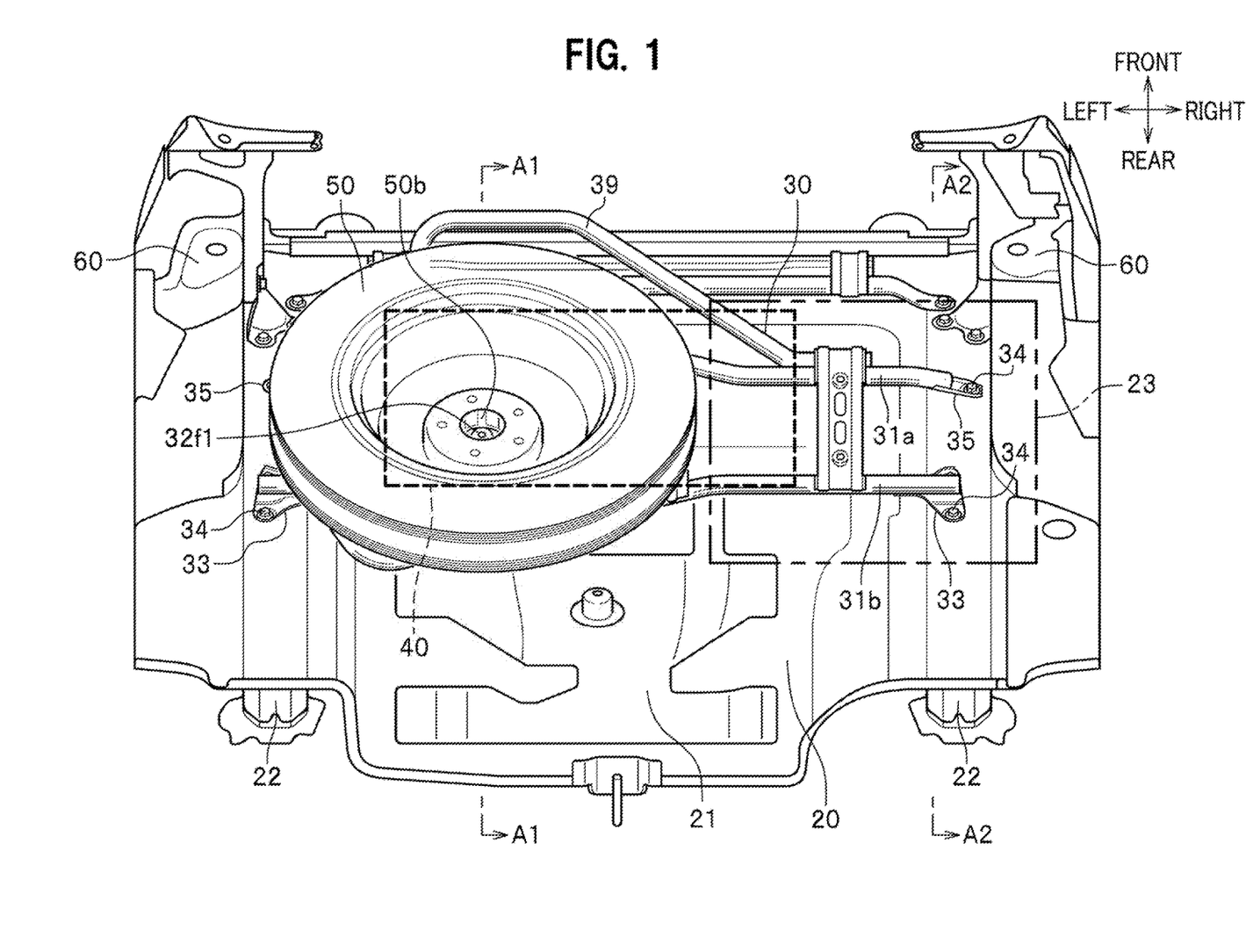
FIG. 1 is a perspective view showing a spare tire mounting structure in which a battery and a spare tire are placed one above the other in a recessed portion of a rear floor of a vehicle body.
Figure 2:
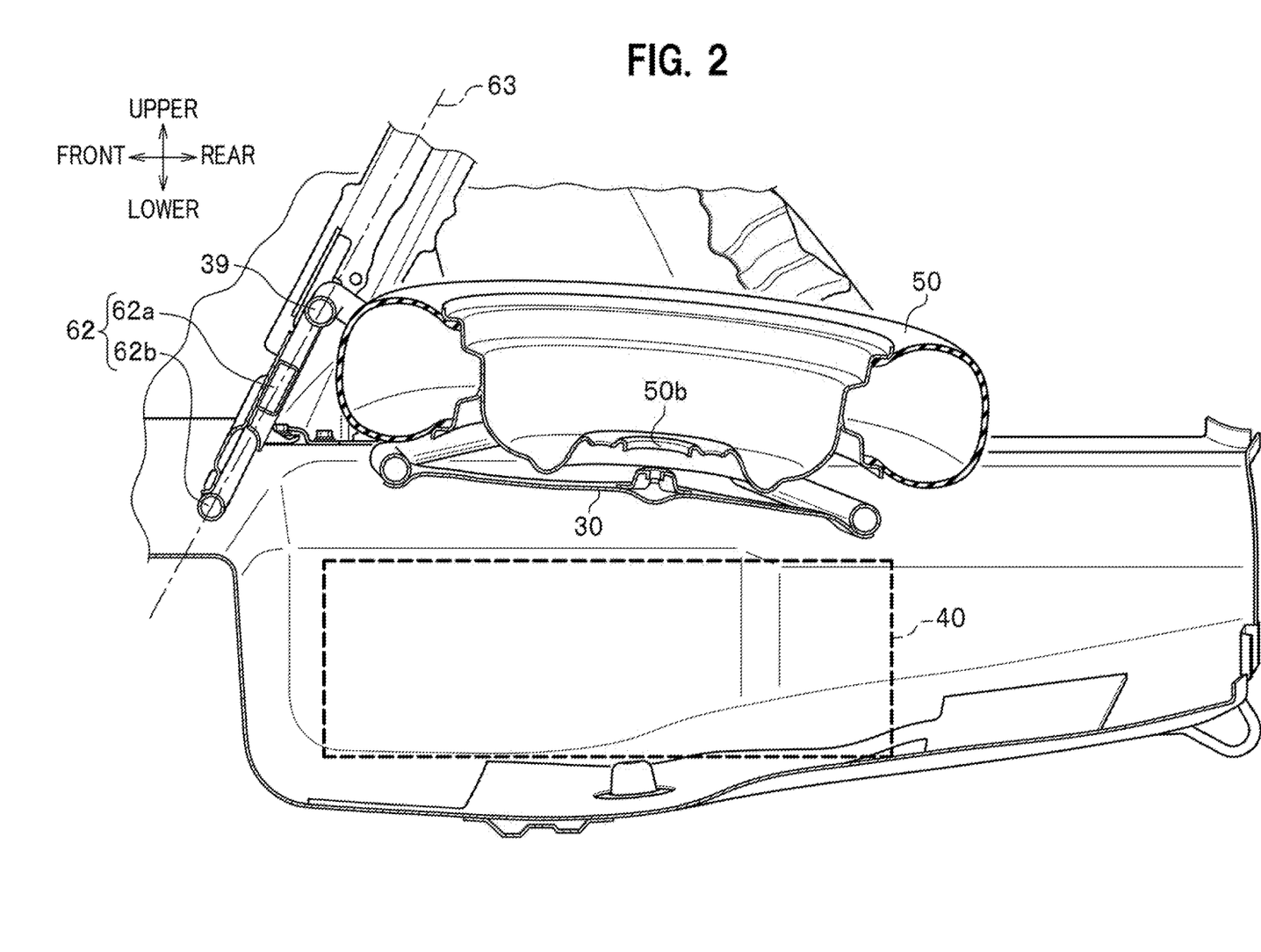
FIG. 2 is a cross-sectional view taken along line A1-A1 of FIG. 1.

FIG. 1 is a perspective view showing a spare tire mounting structure in which a battery and a spare tire are placed one above the other in a recessed portion of a rear floor of a vehicle body, and FIG. 2 is a cross-sectional view taken along line A1-A1 of FIG. 1.

Figure 3:
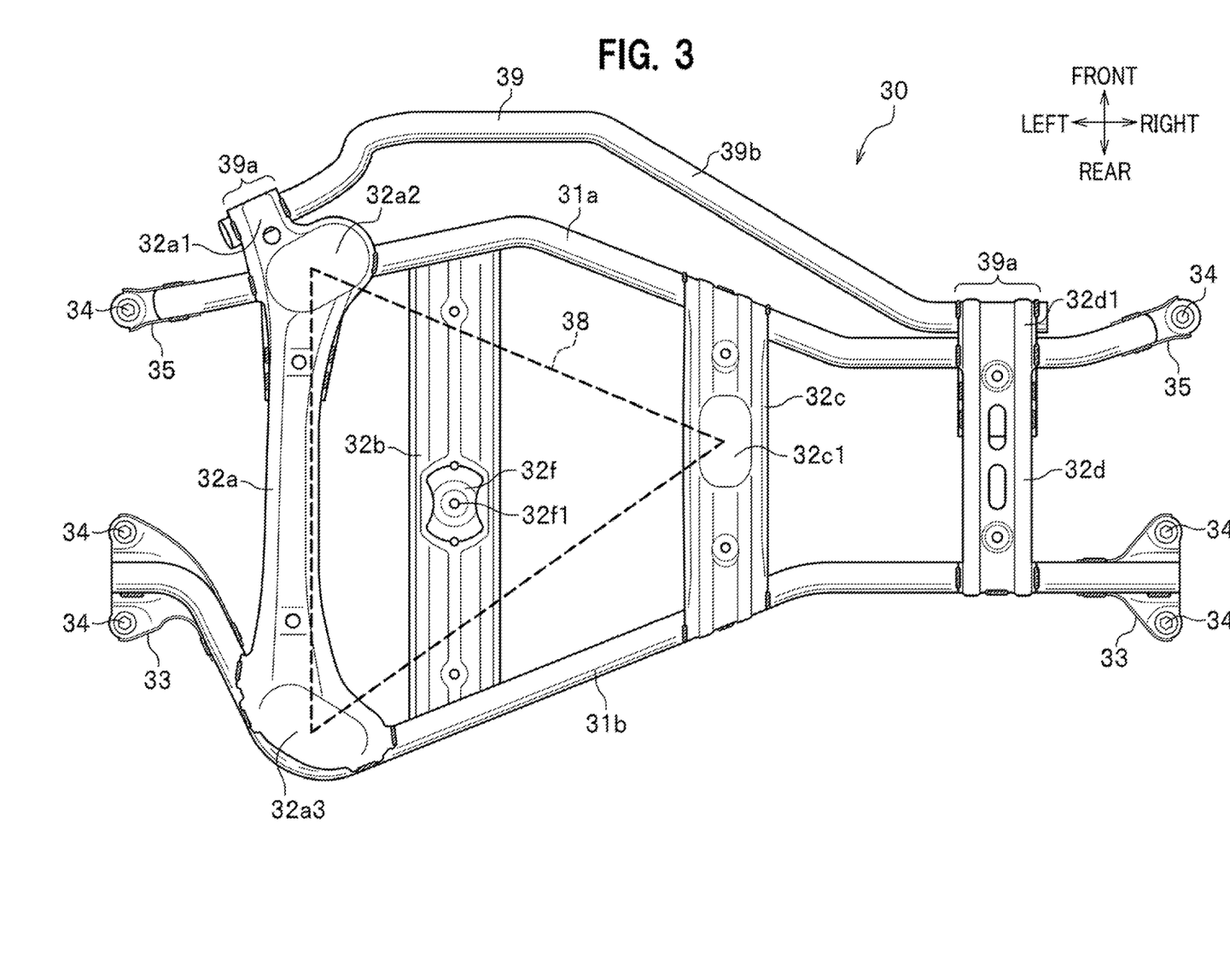
FIG. 3 is a plan view of the upper surface side of a tire mounting device.

In the spare tire mounting structure 10 shown in FIGS. 1 and 2, right and left rear frames 22 extending in the front-rear direction are arranged along the right and left edges in the vehicle width direction of the recessed portion 21 of the rear floor 20 of the vehicle body, and a tire mounting device 30 extending in a ladder shape and including a guard member 39 on the front side of the vehicle body is installed on the right and left rear frames 22, as shown in FIG. 3. The guard member 39 has a shape protruded upward.

As shown in FIGS. 1 and 2, the tire mounting device 30 is installed above the battery 40 placed in the recessed portion 21 of the rear floor 20. The spare tire 50 is mounted sideways (or placed) on this tire mounting device 30. Since the protruded guard member 39 is present on the vehicle body front side of the mounted spare tire 50, the spare tire 50 is restricted by the guard member 39 and does not move forward when a rear collision takes place.

The tire mounting device 30 shown in FIG. 3 includes a mounting pipe member (also referred to as a pipe member) 31a placed on the front side of the vehicle body while extending in the vehicle width direction and a mounting pipe member 31b placed on the rear side, which are connected together (bridge-connected) in a bridging manner by four brackets 32a, 32b, 32c, and 32d extending in the front-rear direction of the vehicle body. Both end portions (or right and left end portions) of the front and rear pipe members 31a and 31b are mounted on the right and left rear frames 22.

Figure 4:
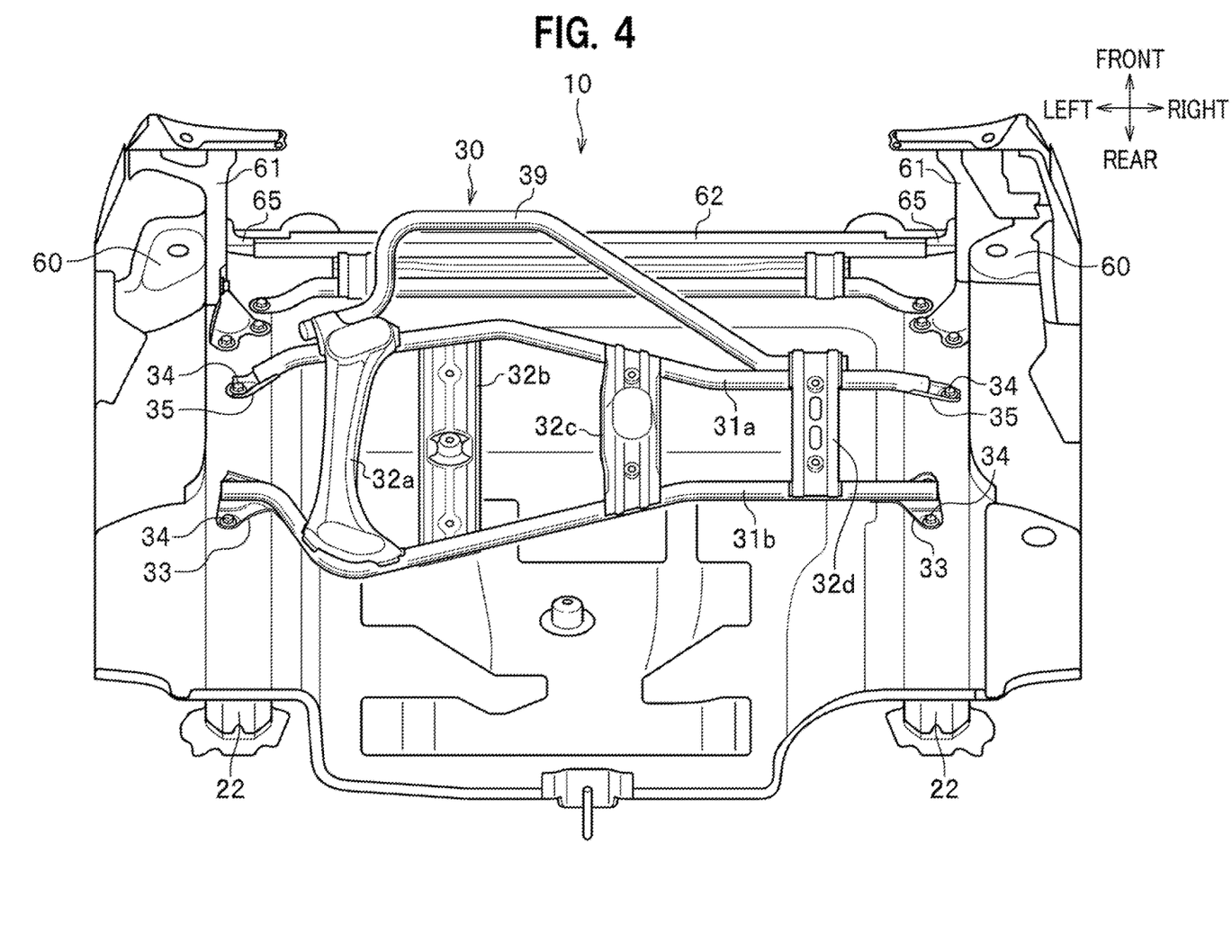
FIG. 4 is a perspective view of the spare tire mounting structure.

The attachment members 33 to be attached to the rear frames 22 are fixed to both end portions of the rear pipe member 31b. The attachment members 33 each have a triangular plate shape, and screw holes 33a (see FIG. 6) are formed at two corners of the triangular plate shape. The attachment members 33 are fixed to the rear frames 22 with screws 34 screwed into the respective screw holes 33a, as shown in FIG. 4. When the attachment members 33 are fixed, the rear pipe member 31b is fixed to the rear frames 22. Long plate-shaped attachment members 35 each having a screw hole 35a (see FIG. 6) are fixed to both end portions of the front pipe member 31a, and the front pipe member 31a is fixed to the rear frames 22 with screws 34 screwed into the respective screw holes 35a.

The front and rear pipe members 31a and 31b are bent in a zigzag shape such that the spare tire 50 (FIG. 1) can be placed on one side in the vehicle width direction. In the present embodiment, as shown in FIG. 1, the spare tire 50 is stably placed on the left side in the vehicle width direction. As shown in FIG. 3, for this one-sided placement, the front-rear distance between the front and rear pipe members 31a and 31b bridge-connected by the brackets 32a to 32d is set long on the left side and is set short on the right side.

To achieve such distances, the four brackets 32a to 32d are sequentially shortened from the left side to the right side. Note that the bracket 32d on the right end side has the shortest length for bridge-connecting the front and rear pipe members 31a and 31b, but additionally has the length of the guard member fixing portion 32d1 for fixing the guard member 39 as described later. For this reason, the total length of the bracket 32d is substantially the same as that of the bracket 32c adjacent to the left side of the bracket 32d. The guard member fixing portion 32d1 is provided on the vehicle body front side of the bracket 32d.

The bracket 32a on the left end side also includes a guard member fixing portion 32a1 on the vehicle body front side. The guard member 39 is fixed to the guard member fixing portion 32a1 on the left end side and to the guard member fixing portion 32d1 of the bracket 32d on the right end side.

The tire mounting device 30 having such a structure is formed such that a pair of pipe members 31a and 31b spaced apart in the front-rear direction are connected together with the multiple brackets 32a to 32d in the bridging manner, and the guard member 39 is fixed to the front ends of the left end and right end brackets 32a and 32d. Therefore, the tire mounting device 30 achieves a high strength with a small number of components. Moreover, since the front and rear pipe members 31a and 31b are bent in the zigzag shape, the strength can be further increased. Since the tire mounting device 30 has a high strength as described above, the tire mounting device 30 only has to be attached, alone without reinforcement, to the rear frames 22 with screws or bolts and nuts, and therefore can be easily attached to the rear frames 22.

As shown in FIG. 3, the tire mounting device 30 includes three bearing surfaces 32a2, 32a3, and 32c1 placed at the positions of the vertices of a substantially equilateral triangle 38. Moreover, the front and rear (pair of) pipe members 31a and 31b are bent such that the distance between the front and rear pipe members 31a and 31b on the one side in the vehicle width direction is wider than the distance between the front and rear pipe members 31a and 31b on the other side in the vehicle width direction. The spare tire 50 (FIG. 1) is placed on the one side in the vehicle width direction, and is supported by the three bearing surfaces 32a2, 32a3, and 32c1. The three bearing surfaces 32a2, 32a3, and 32c1 are formed on the upper surfaces of the brackets 32a and 32c. Note that the substantially equilateral triangle 38 may be an equilateral triangle and constitutes a triangle cited in the claims.

Since the spare tire 50 is placed on the one side in the vehicle width direction in the tire mounting device 30, it is possible to secure a space 23 for placing luggage or the like on the rear floor 20, as shown in FIG. 1. Additionally, since the front and rear pipe members 31a and 31b are bent in such a zigzag shape that the spare tire 50 can be received by the three vertices of the substantially equilateral triangle 38 on the brackets 32a and 32c as shown in FIG. 3, it is possible to stably support the spare tire 50. In other words, since the spare tire 50 is supported at the three points, it is possible to prevent the spare tire 50 from rattling because unnecessary hitting is avoided. Moreover, since the pipe members 31a and 31b are simply bent, easy manufacturing is possible at low cost, and the zigzag shape bent makes it possible to achieve a high strength.

The three vertices of the substantially equilateral triangle 38 on the upper surfaces of the brackets 32a and 32c are formed by the three bearing surfaces 32a2, 32a3, and 32c1 (see the bearing surface 32a2 in FIG. 5) formed by bulging the upper surfaces. A bearing surface 32a2 is formed on the front side of the left bracket 32a of the brackets 32a and 32c, and a bearing surface 32a3 is formed on the rear side thereof. A bearing surface 32c1 is formed at the front-rear center position of the right bracket 32c.

As in this structure, the upper surfaces of the brackets 32a and 32c are bulged to form the three bearing surfaces 32a2, 32a3, and 32c1. Thus, it is possible to form a structure in which the spare tire 50 is supported by the three vertices of the substantially equilateral triangle 38 inexpensively with a small number of components. In addition, since the bearing surfaces 32a2, 32a3, and 32c1 are formed by bulging the upper surfaces of the brackets 32a and 32c, they can be formed with a high strength.

Figure 5:
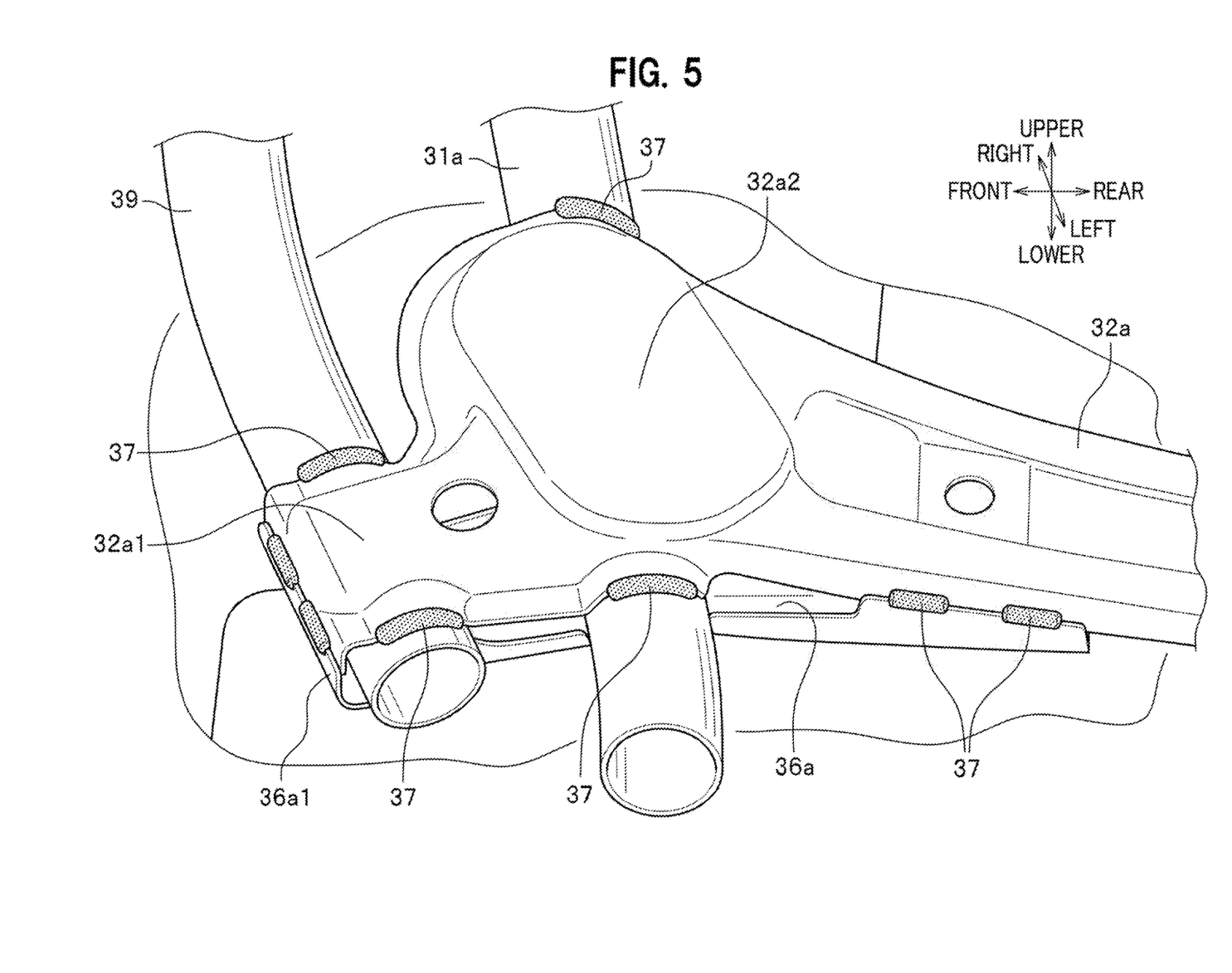
FIG. 5 is a perspective view showing a mounting structure on one side of a guard member and a front mounting pipe member in the tire mounting device.

The front bearing surface 32a2 of the left bracket 32a is welded to the front pipe member 31a by MIG welding or the like, as shown in FIG. 5, and the rear bearing surface 32a3 is welded to the rear pipe member 31b by MIG welding or the like.

This welding makes it possible to increase the joint strength of the front and rear bearing surfaces 32a2 and 32a3 of the bracket 32a to the front and rear pipe members 31a and 31b.

Figure 6:
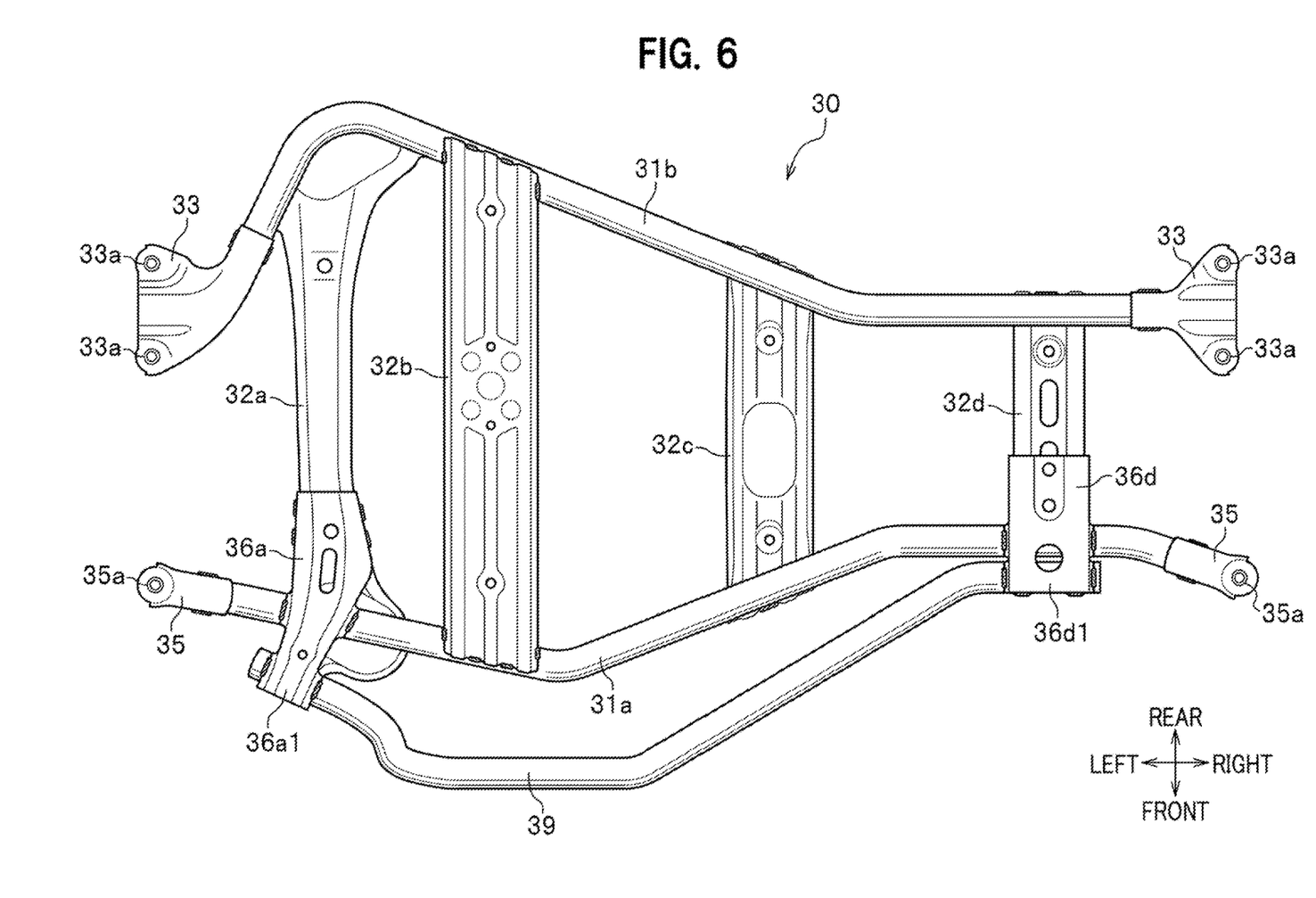
FIG. 6 is a plan view of the lower surface side of the tire mounting device.

Below the brackets 32a and 32d (also referred to as upper brackets 32a and 32d) located on both sides of the pipe members 31a and 31b shown in FIG. 3, additional brackets 36a and 36d (also referred to as lower brackets 36a and 36d) shorter than the brackets 32a and 32d are provided, as shown in FIG. 6.

The lower bracket 36a on the left end side has a length of about ⅓ of the upper bracket 32a, and the lower bracket 36d on the right end side has a length of about ½ of the upper bracket 32d. The distal end portions of the lower brackets 36a and 36d serve as guard member fixing portions 36a1 and 36d1. These guard member fixing portions 36a1 and 36d1 each have a curved shape that fits into a part of the pipe circumferential surface of the guard member 39, as shown in FIG. 5 as a representative of the guard member fixing portion 36a1. The portions of the lower brackets 36a and 36d shown in FIG. 6 that come into contact with the pipe members 31a and 31b are each also in a curved shape.

Moreover, the guard member fixing portions 32a1 and 32d1 of the upper brackets 32a and 32d on both end sides are each also in a curved shape. Both side portions in the vehicle width direction of the front and rear bearing surfaces 32a2 and 32a3 of the upper bracket 32a on the left side are each also in a curved shape, as shown in FIG. 5 as a representative of the bearing surface 32a2. The portions of the upper bracket 32d on the right end side that come into contact with the front and rear pipe members 31a and 31b are each also in a curved shape.

Additionally, in each of the two brackets 32b and 32c between the upper brackets 32a and 32d on both end sides shown in FIG. 6, the portions that come into contact with the front and rear pipe members 31a and 31b are each in a curved shape.

With such upper brackets 32a and 32d and lower brackets 36a and 36d on both end sides, the guard member 39 and the front and rear pipe members 31a and 31b are sandwiched from above and below and fixed by welding by MIG welding or the like. FIG. 5 shows the upper bracket 32a and the lower bracket 36a as representatives of the state where the pipe members 31a and 31b are sandwiched from above and below and welded, and reference numerals 37 are attached to the welding points. These welding points 37 include the contact positions between the curved shape portions of the guard member fixing portion 32a1 and the guard member 39, the contact positions between the curved shape portions on both sides of the bearing surface 32a2 and the pipe member 31a, and further the contact positions between the rear end portion of the lower bracket 36a and the upper bracket 32a. In addition to the above, although not visible in FIG. 5, contact positions between the lower bracket 36a and the pipe member 31a are also welded.

As in this structure, the front and rear pipe members 31a and 31b are sandwiched and fixed by welding with the upper brackets 32a and 32d and the lower brackets 36a and 36d, thereby achieving a high strength joint. Thus, the tire mounting device 30 can be configured with a high strength.

Plus, the guard member 39 is sandwiched and fixed by welding with the guard member fixing portion 32a1 of the upper bracket 32a on the left end side and the guard member fixing portion 36a1 of the lower bracket 36a, and is also sandwiched and fixed by welding with the guard member fixing portion 32d1 of the upper bracket 32d on the right end side and the guard member fixing portion 36d1 of the lower bracket 36d. Therefore, it is possible to achieve a high-strength joint structure capable of enduring a rear collision.

As shown in FIG. 3, the guard member 39 is a pipe member and includes fixing portions 39a which are fixed via the brackets 32a and 32d to the front pipe member 31a near the right and left rear frames 22 in the vehicle width direction, and an interference portion 39b which is bent so as to interfere with the spare tire 50 placed on the one side of the pipe members 31a and 31b. Preferably, the interference portion 39b—is bent in the upper-lower direction, the right-left direction, and a slanting direction so as to interfere with a tread surface 50a of the spare tire 50 in the largest possible area, as shown by the broken lines in FIG. 7. Note that, as shown by the broken lines, the height of the interference portion 39b of the guard member 39 is lower than the width of the tread surface 50a, but the interference portion 39b may protrude more upward beyond the width.

With this structure, the guard member 39 is a pipe member, and thus can be easily bent to form the fixing portions 39a and the interference portion 39b. Additionally, even the spare tire 50 located on the one side in the vehicle width direction can be supported with a high strength by the fixing portions 39a which is fixed via the brackets 32a and 32d to the pipe member 31a near the rear frames 22.

Figure 7:
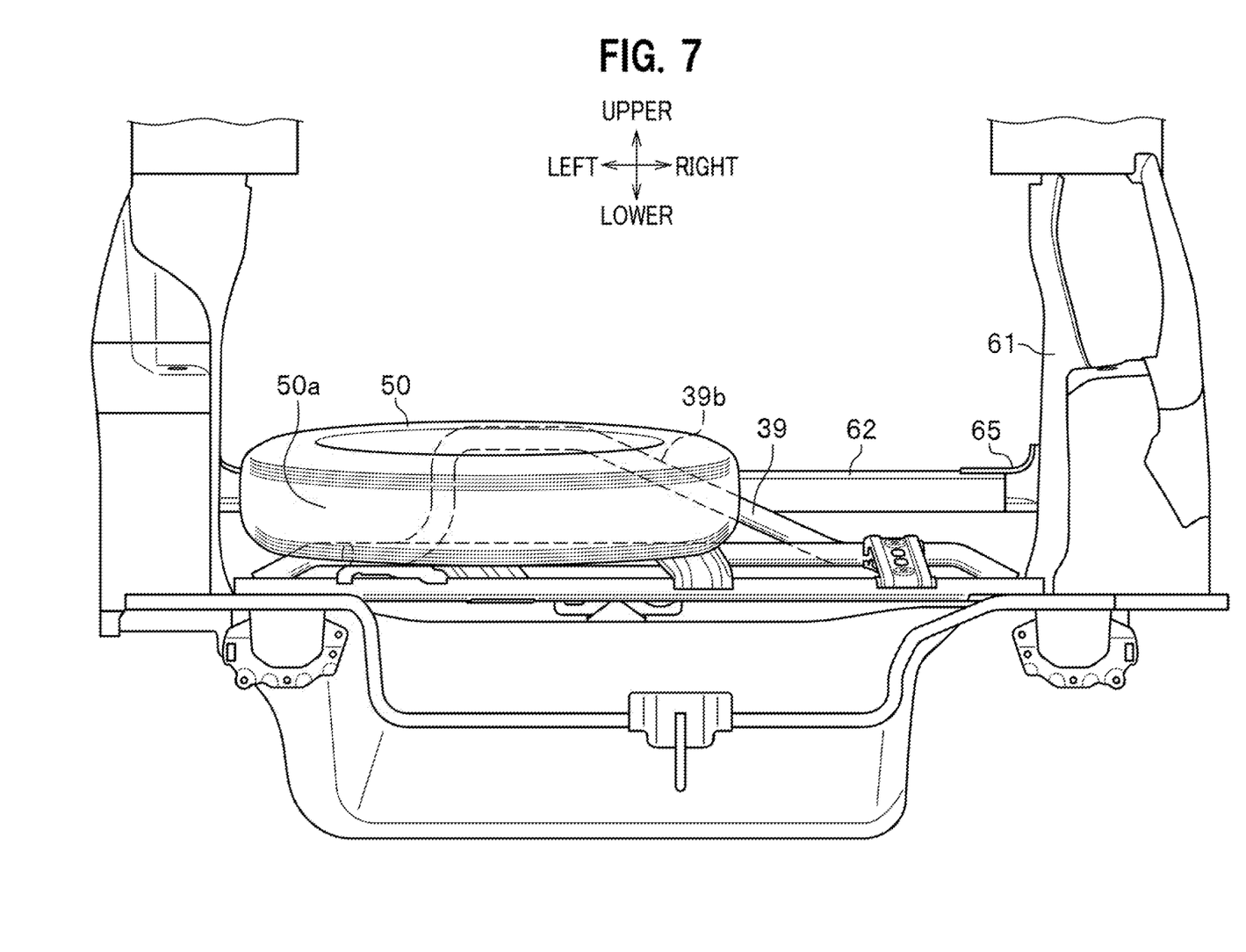
FIG. 7 is a partial cross-sectional view of the spare tire mounting structure as viewed from the side surface.

Further, when the spare tire 50 moves to the front side at rear collision, its tread surface 50a immediately interferes with and is restricted by (hits and is stopped by) the guard member 39. Thus, the spare tire 50 can be stopped so as not to move forward. At this moment, since the tread surface 50a interferes with (hits) the guard member 39 in a large area, the spare tire 50 can be stopped more effectively.

Next, as shown in FIG. 3, at least one of the multiple brackets 32a to 32d includes a spare tire fixing unit (fixing unit) 32f for fixing the spare tire 50. Specifically, in the triangle 38 connecting the three bearing surfaces 32a2, 32a3, and 32c1 on which the spare tire 50 is mounted, a spare tire fixing unit 32f is fixed by welding or the like to a central portion in the front-rear direction of the bracket 32b located inside the triangle 38.

The spare tire fixing unit 32f has a washer shape with a bulged central portion, and a screw hole 32f1 is provided at the center of the bulged portion. As shown in FIG. 1, the spare tire 50 is mounted on the bearing surfaces 32a2, 32a3, and 32c1 with the through hole 50b at the center of the spare tire 50 vertically aligned with the screw hole 32f1. After this mounting, a screw (not shown) whose head is wider than the through hole 50b is inserted through the through hole 50b and screwed into the screw hole 32f1 to fix the spare tire 50.

As in this structure, the spare tire 50 mounted on the triangle of the three bearing surfaces 32a2, 32a3, and 32c1 is screwed to the spare tire fixing unit 32f fixed to the bracket 32b in the triangle. Thereby, the spare tire 50 can be stably fixed with a high strength. This fixing structure can be achieved with a small number of components.

The brackets 32b and 32c connecting only the front and rear pipe members 31a and 31b are placed between the brackets 32a and 32d on both end sides shown in FIG. 3. Two or more brackets 32b and 32c connecting only the front and rear pipe members 31a and 31b are provided side by side on the right and left, and are alternately connected to the upper and lower surfaces of the pipe members 31a and 31b. To further explain, as shown in a perspective view in FIG. 8 as a representative of how the brackets 32a to 32d are fixed to the front pipe member 31a, one (left) bracket 32b connecting only the front and rear pipe member 31a (and pipe member 31b) is fixed (connected) to the lower surface of the pipe member 31a, and the other (right) bracket 32c is fixed to the upper surface of the pipe member 31a.

Figure 8:
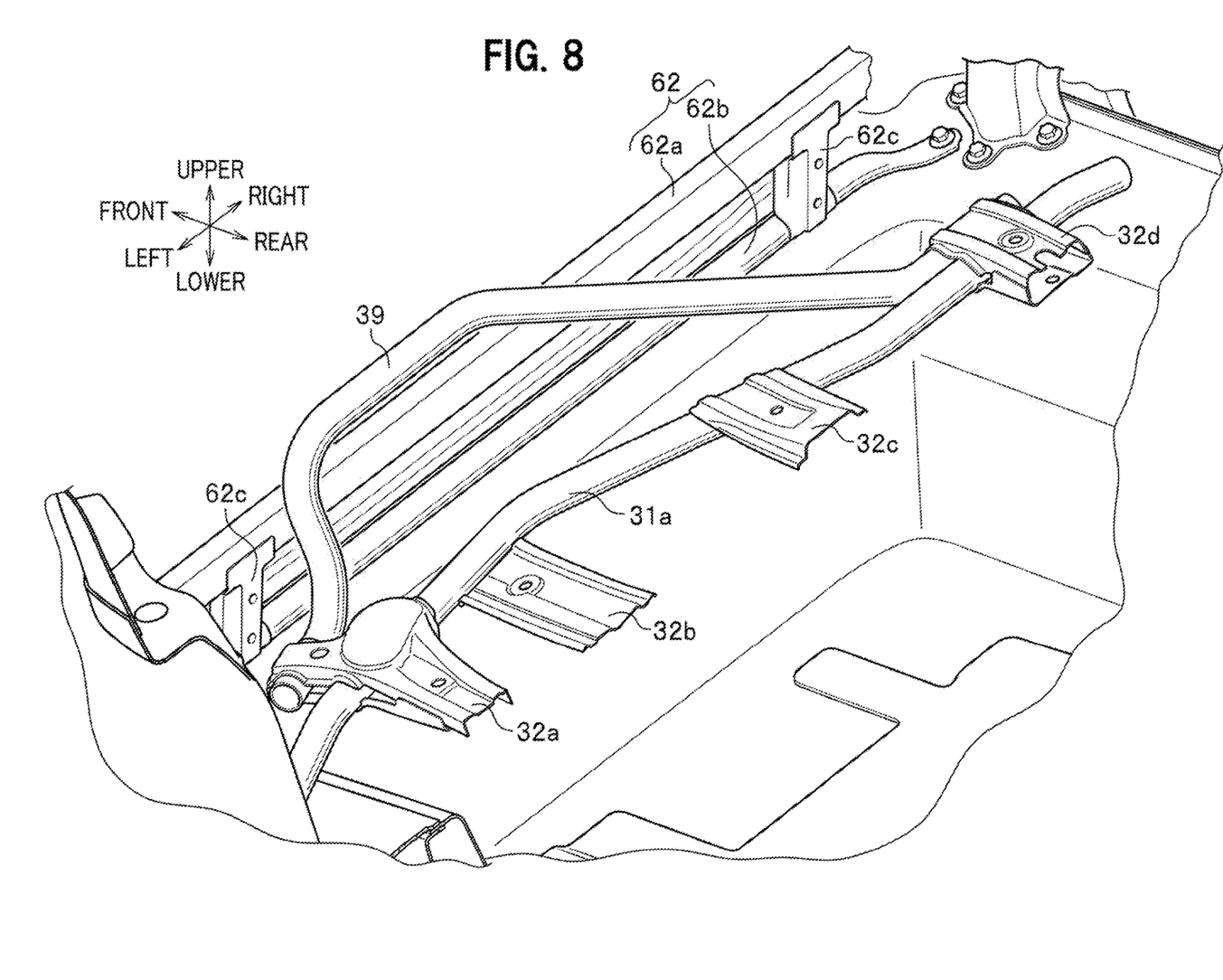
FIG. 8 is a perspective view of the spare tire mounting structure showing a part of the tire mounting device and a cross member.

As in this structure, the upper and lower surfaces of the pipe members 31a and 31b are alternately connected by the brackets 32b and 32c. Thereby, the pipe members 31a and 31b can be fixed in a well-balanced manner from above and below. Therefore, the pipe members 31a and 31b can be connected with a high strength with a small number of components.

As shown in FIG. 4, rear damper bases 60 are arranged on the right and left of the vehicle, and reinforcing members 61 are fixed to the respective right and left rear damper bases 60 by welding. A cross member 62 is installed on the right and left reinforcing members 61 via a connecting member 65 (see FIG. 7), and the guard member 39 is placed above the cross member 62. As shown in FIG. 8, in the cross member 62, an upper cross member 62a and a lower cross member 62b, which are spaced apart in the upper-lower direction, are connected together by right and left connecting members 62c.

As shown in FIG. 2, an upper side of the guard member 39 (see FIG. 4) extending horizontally in the vehicle width direction is aligned above a slanting line 63 connecting the upper and lower cross members 62a and 62b in the upper-lower direction. As shown in FIG. 4, both sides of the upper cross member 62a are fixed to the reinforcing members 61, and both sides of the lower cross member 62b are fixed to the rear frames 22. By this fixture, the cross member 62 is firmly fixed.

When the horizontal upper side of the guard member 39 and the cross member 62, which are each firmly fixed, are aligned with the slanting line 63 inclined upward from the bottom to the rear as described above, the spare tire 50 moving forward due to a rear collision can be stopped by a strong reaction force of both the guard member 39 and the cross member 62.

Figure 9:
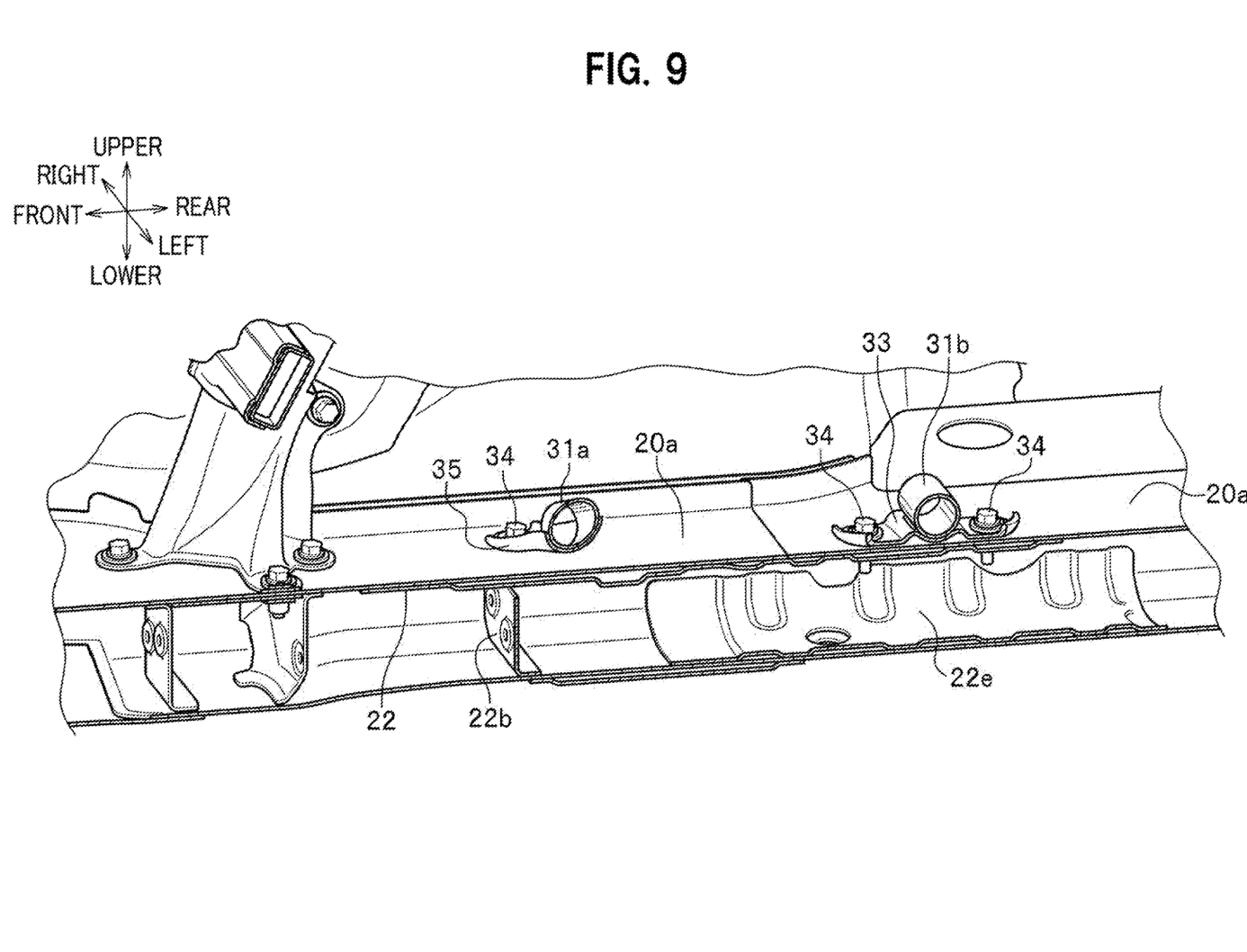
FIG. 9 is a cross-sectional view taken along line A2-A2 of FIG. 1.

As shown in FIG. 9, the front and rear pipe members 31a and 31b are fixed to the floor panel 20a of the rear floor 20 (FIG. 1) near the bulkhead 22b of the rear frame 22 or near the reinforcing member 22e.

Figure 10:
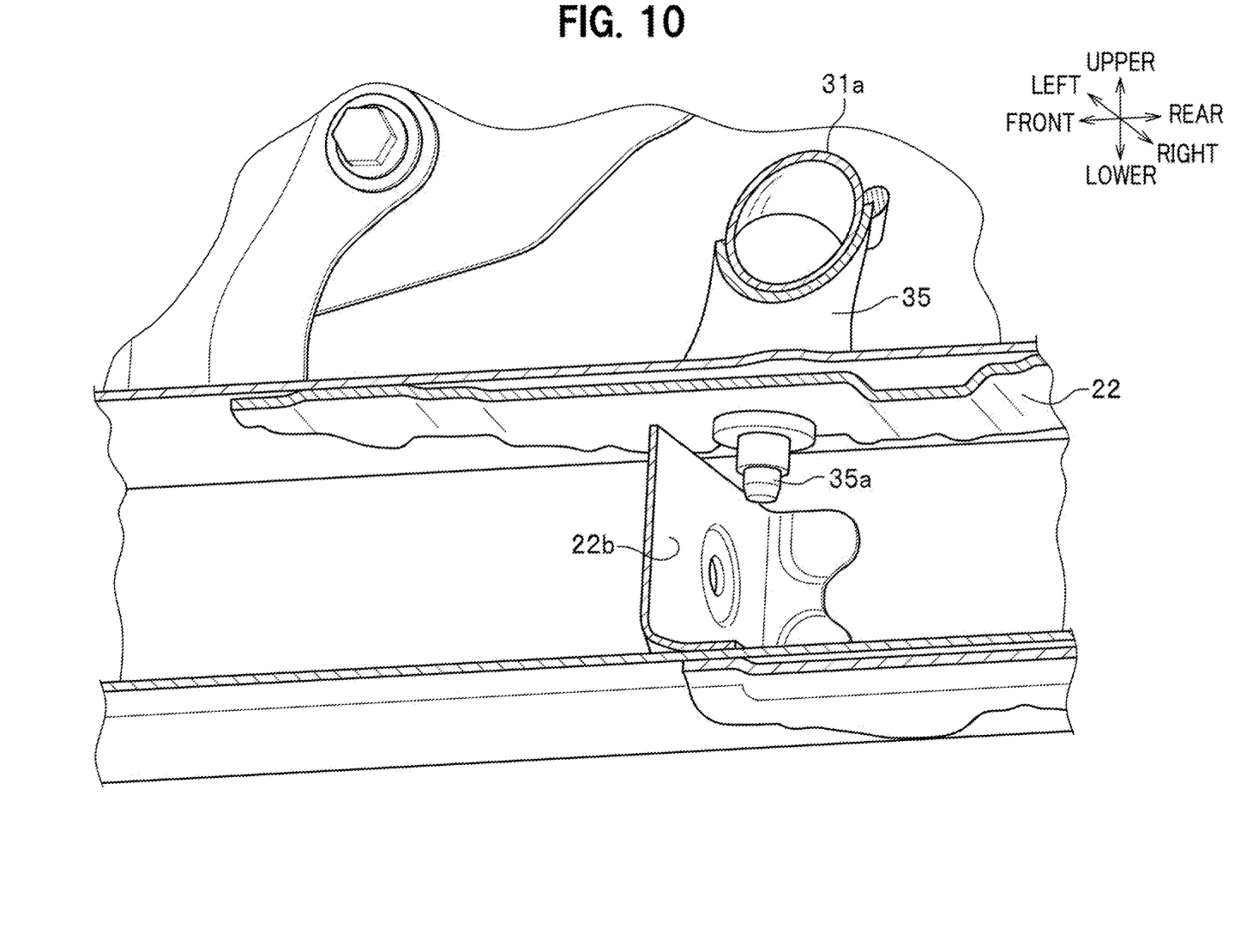
FIG. 10 is a cross-sectional view showing the mounting structure of the front mounting pipe member in the tire mounting device.

To further explain, the attachment members 35 at both end portions of the front pipe member 31a are, as shown in FIG. 10 as a representative of one of them, each fixed by the screw 34 to the rear frame 22 near the strong bulkhead 22b. The bulkhead 22b is arranged in the upper-lower direction in a wall shape so as to partition the interior of the rear frame 22 extending in the front-rear direction into the front and rear compartments. Additionally, the attachment members 33 on both end sides of the rear pipe member 31b shown in FIG. 9 are each fixed by the screws 34 to the floor panel 20a near the reinforcing member 22e fixed to the inner wall of the rear frame 22. The reinforcing member 22e is made of a strong material that is fixed to the inner wall of the rear frame 22 by extending in the longitudinal direction.

Note that the attachment members 35 of the front pipe member 31a may each be fixed to the bulkhead 22b, and the attachment members 33 of the rear pipe member 31b may each be fixed to the reinforcing member 22e.

As above, the front and rear pipe members 31a and 31b are fixed to the floor panel 20a near the strong bulkhead 22b and the reinforcing member 22e, or fixed to the floor panel 20a, the bulkhead 22b, and the reinforcing member 22e. Therefore, it is possible to increase the strength of supporting the rear collision load on the guard member 39.

Hereinabove, description has been provided for the spare tire mounting structure according to the present embodiment, but the present invention is not limited to this, and can be appropriately modified without departing from the gist of the present invention.

What is claimed is:

1. A spare tire mounting structure, comprising:
    a tire mounting device which is installed on rear frames extending in a front-rear direction along right and left edges of a rear floor of a vehicle body, and which mounts a spare tire above a battery housed in a recessed portion of the rear floor, wherein
    the tire mounting device includes a guard member which restricts forward movement of the spare tire, and
    the tire mounting device is formed by connecting a pair of front and rear mounting pipe members extending in a vehicle width direction with a plurality of brackets extending in the front-rear direction, and by fixing the guard member to front ends of the brackets.

2. The spare tire mounting structure according to claim 1, wherein
    the tire mounting device includes three bearing surfaces placed at positions of vertices of a triangle,
    the pair of mounting pipe members are bent such that a distance between the pair of mounting pipe members on one side in the vehicle width direction is wider than a distance between the pair of mounting pipe members on the other side in the vehicle width direction, and
    the spare tire is placed on the one side in the vehicle width direction, and is supported by the three bearing surfaces.

3. The spare tire mounting structure according to claim 2, wherein
    the three bearing surfaces are formed on upper surfaces of the brackets.

4. The spare tire mounting structure according to claim 3, wherein
    the three bearing surfaces include bulged portions formed by bulging portions of the brackets upward.

5. The spare tire mounting structure according to claim 4, wherein
    two of the bearing surfaces are welded to the mounting pipe members.

6. The spare tire mounting structure according to claim 1, further comprising:
    additional brackets below the brackets located on both sides of the mounting pipe members, wherein
    the brackets on both sides sandwich and fix the mounting pipe members.

7. The spare tire mounting structure according to claim 6, wherein
    the guard member is sandwiched and fixed by front ends of the upper and lower brackets.

8. The spare tire mounting structure according to claim 2, wherein
    the guard member is a pipe member and includes fixing portions which are fixed to the mounting pipe members near the right and left rear frames in the vehicle width direction, and an interference portion which is bent so as to interfere with the spare tire placed on the one side of the mounting pipe members.

9. The spare tire mounting structure according to claim 1, wherein
    at least one of the plurality of brackets includes a fixing unit for the spare tire.

10. The spare tire mounting structure according to claim 1, wherein
    two or more of the brackets connecting only the pair of front and rear mounting pipe members are provided side by side on right and left, and are alternately connected to upper surfaces and lower surfaces of the mounting pipe members.

11. The spare tire mounting structure according to claim 1, wherein
    reinforcing members which support right and left rear damper bases are placed in front of the tire mounting device, and
    the guard member is aligned above a cross member installed on the reinforcing members.

\* \* \* \* \*